United States Patent [19]
Keens et al.

[11] Patent Number: 5,097,457
[45] Date of Patent: Mar. 17, 1992

[54] OPTICAL RECORDING SYSTEM HAVING A ROTATING OPTICAL ELEMENT PROVIDED THEREIN

[75] Inventors: Andrew P. Keens, Hillingdon; Anthony P. Lang, Epsom, both of England

[73] Assignee: Thorn EMI plc, London, England

[21] Appl. No.: 307,924

[22] Filed: Feb. 9, 1989

[30] Foreign Application Priority Data

Feb. 10, 1988 [GB] United Kingdom ............... 8803084
Feb. 10, 1988 [GB] United Kingdom ............... 8803085

[51] Int. Cl.$^5$ ................................................ G11B 7/00
[52] U.S. Cl. .................................... 369/44.17; 369/97; 369/112
[58] Field of Search ............... 369/93, 95, 97, 44.17, 369/112, 44.37, 44.21, 113, 110, 111, 44.38

[56] References Cited

U.S. PATENT DOCUMENTS

| | | | |
|---|---|---|---|
| 4,425,636 | 1/1984 | Musha et al. | 369/44.37 |
| 4,525,828 | 6/1985 | Higashiyama et al. | 369/97 |
| 4,607,359 | 8/1986 | Matsubayashi et al. | 369/44.38 |
| 4,633,455 | 12/1986 | Hudson . | |
| 4,654,549 | 3/1987 | Ando . | |
| 4,694,447 | 9/1987 | Cohen et al. | 369/112 |

FOREIGN PATENT DOCUMENTS 57-88535 6/1982 Japan .
60-063748 8/1985 Japan .

*Primary Examiner*—Roy N. Envall, Jr.
*Assistant Examiner*—Thang V. Tran
*Attorney, Agent, or Firm*—Fleit, Jacobson, Cohn, Price, Holman & Stern

[57] ABSTRACT

A single channel optical recording system is described, which system does not require a second rotating optical element. The system uses focus error correction components located outside the rotating drum. Light transmitted to and from the drum is at all times axially symmetric, thus circumventing the problem of image rotation. Lateral error correction takes place entirely within the drum, requiring only the transmission of d.c. electrical power across the rotating interface. Preferably the physical distribution of optical components within the drum is symmetric to ensure mechanical balance. A dual beam tracking system to write data in compact form in a single-channel optical tape recorder is also described. The tracking is achieved in the drum and without any additional optical elements. Passive or active alignment of the two beams before entering the drum is achieved using an extended anamorphic prism pair and without introducing additional optical surfaces into the beam path.

9 Claims, 7 Drawing Sheets

OPTICAL RECORDING SYSTEM HAVING A ROTATING OPTICAL ELEMENT PROVIDED THEREIN

BACKGROUND OF THE INVENTION

The present invention relates to equipment for use in an optical recording system, and it relates especially, but not exclusively, to such equipment for use in an optical tape recording system.

In a helical scan optical tape recorder with optical components external to the rotating drum, around which the tape is caused to pass for transducing purposes, it is necessary to overcome the problems caused by rotation of the optical image as directed to the tape. This compensation can be achieved by use of a second rotating element.

However, for a single track system, the situation can be simplified by matching the axis of the external optical system to the axis of rotation of the drum. If this is done then the focussed spot image merely rotates about its own axis of symmetry, thus avoiding the need for de-rotation of the image. This is particularly so if the spot itself is truly circularly symmetrical. This invocation of symmetry provides a single channel optical tape recorder which does not require additional optical components in order to effectively "de-rotate" the image as directed on to the tape.

The use of axial symmetry for a single channel tape recorder is applicable regardless of changes in the focus of the system, and so an external focal tracking mechanism (for example similar to one used in compact disc technology) is viable.

Unlike focal tracking, however, the lateral (i.e. transverse to the recorded tracks) tracking of data does not preserve axial symmetry. For an external tracking servo mechanism to operate, it needs to generate a circular tracking motion. This can be achieved with an x/y scanner fed with out-of-phase sine waves. However the rotating nature of the spot image makes the acquisition of a suitable tracking error signal extremely difficult. Therefore in a single axis system the tracking detection, at least, is placed within the drum.

SUMMARY OF THE INVENTION

According to the invention there is provided an optical recording arrangement including source means for generating a beam of optical radiation and an optical system for constraining said beam to impinge upon a recording medium which is capable of moving, relative to the beam, in such a way that the beam scans the surface of the medium in accordance with a prescribed pattern of information tracks assigned to said surface, wherein the optical system includes first components which remain stationary relative to the source means and second components which are subject to rotational movement, relative to said source means and said first components, about an axis of rotation which coincides with the optic axis of said first components, the aforesaid motion of the medium relative to the beam including at least a rotational movement about said axis of rotation and at substantially the same rate as that at which said second components rotate thereabout; the second components including means for sensing tracking errors of said beam laterally of said information tracks.

In order that the invention may more readily be understood, a description is now given by way of example only, reference being made to the accompanying drawings, in which:

DETAILED DESCRIPTION OF THE PREFERRED EMBODIMENTS

Figure 1:
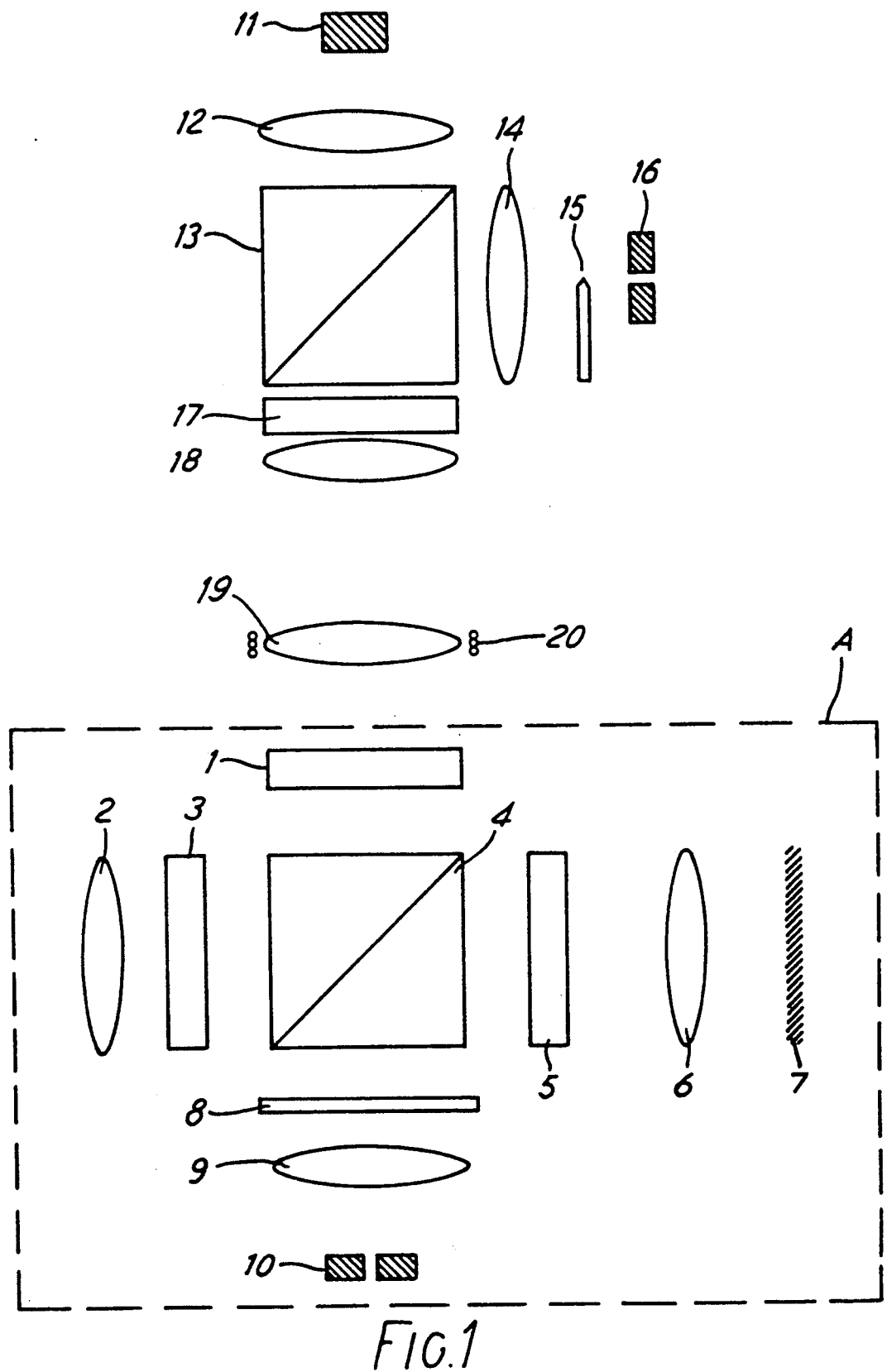
FIG. 1 shows schematically a single channel tape recorder incorporating one example of the present invention.

Referring now to FIG. 1, the optical components used for lateral tracking are shown at referenced 1 to 10. The components are disposed within the drum (shown schematically by the broken line box A). The external optical components include a main write laser 11, collimation and expansion components 12, a beam splitter 13, focus detection optics 14, 15, 16, and a focus servo mechanism 18, 19, 20. For complete optical symmetry a quarter wave plate 17 is included to circularly polarise the light, since the light generated by the laser 11 is typically linearly polerised. The external components 11-20 remain static during operation, while of course the drum, and the components 1-10 contained therein, rotate.

If the focus detection system is of the knife edge variety, with a differential focus error signal derived from a split detector 16 then the read data signal is derived from the summation of the diodes of the split detector.

As indicated above, for a single axis optical tape recorder to be viable, the optical components used for lateral tracking error detection must be located inside the drum. To avoid the transfer of electrical tracking signals across the rotating interface, and to avoid the need for a circular tracking motion, the track servo mechanism and its associated electronic components must also be located within the drum.

In order to generate a tracking error signal related to the focused spot position on the tape, the tracking error must be detected on the static side of the track servo mechanism. Conventionally this requires an additional beam splitter before the servo mechanism, but the system shown in FIG. 1 achieves this using the beam deflector as the beam splitter.

Light from the optical components 11-20 external to the drum enters the drum on its rotational axis. It is deflected by the beam splitter 4 through the imaging lens 2 onto the surface of a tape passing around the drum. Deflection of this focussed spot may be achieved by tilting the beam splitter 4.

Light reflected from the tape passes back along its path to the beam splitter 4 which divides the light. The reflected light travels out of the drum again along the drum axis. The transmitted portion is focussed by the lens 6 onto a mirror 7 and is again reflected back along its path. This time the beam splitter 4 deflects the light via an imaging lens 9 onto the split differential tracking error detector 10.

Figure 2:
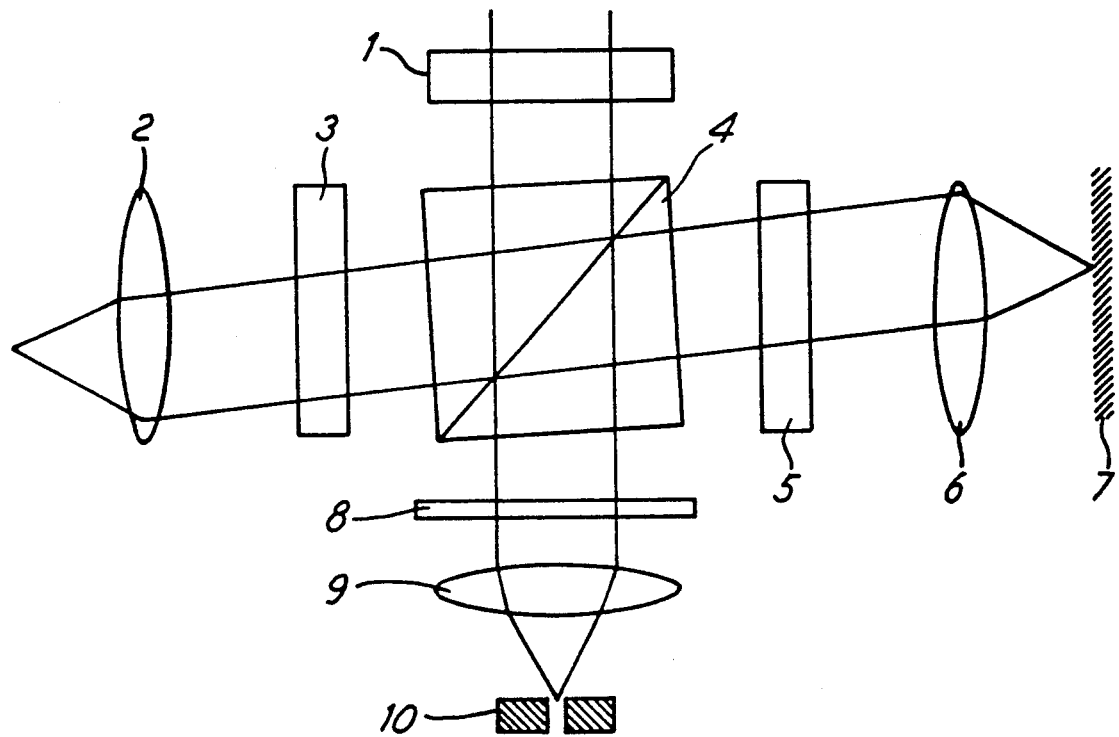
FIG. 2 shows schematically the beam path for the in-drum tracking mechanism.

As the beam splitter 4 tilts (see FIG. 2), the spot focussed on the tape is displaced. Meanwhile (as shown by simple geometry) the spot focussed on the detector 10 remains static with respect to the detector. The detector senses tracking errors by responding to variation in the first-order lobes of the beam pattern as received thereby. The geometry of this system, being symmetric also provides a mechanical balance within the rotating drum.

The beam path as described above ignores the light transmitted at the first and third reflections of the beam splitter. This stray light can be minimised by use of a mostly reflective beam splitter, but this arrangement results in a poor signal from the tracking error detector 10, and for this reason, it is preferable to use polarisation sensitive optical components at certain strategic points in the optical paths. Thus a quarter-wave plate 1 is placed on axis at the entrance of the drum, so that light circularly polarised by the static quarter-wave plate 17 is converted to a linear polarisation in the frame of reference of the drum. This allows the use of polarisation sensitive optics inside the drum whilst preserving the circular symmetry of the light as it crosses the interface between static and rotating components. Advantageously, then, a dichroic sheet polariser 8 can be used to eliminate most of the light transmitted at the first reflection of the beam splitter 4.

The light path described above can now be achieved without significant stray radiation, by making the beam splitter 4 polarisation sensitive and including two additional quarter-wave plates 3 and 5. Since the light passes twice through these quarter-wave plates 3 and 5 they each act as respective half-wave plates, rotating the polarisation of the reflected beams. The system is then used as follows: the axial wave plate 1 is aligned to give maximum reflection from the polarising beam splitter 4. This polarisation of the reflected beam is rotated by the wave plate 3 and so the beam reflected from the tape is split on the return pass through the beam splitter 4, the ratio of this split being dependent on both the orientation of the wave plate 3 and the characteristics of the beam splitter 4. The quarter-wave plate 5 is then aligned to rotate the polarisation of the transmitted light back to the maximum reflection state.

It is possible to use a conventional polarising beam-splitting cube in the arrangement described here. In this case the reflectivity is very high for one polarisation state and very low for the orthogonal state. The beam-splitting ratio is then determined almost entirely by the orientation of the wave plate 3, and the light reflected back along the axis of rotation is converted back to its initial state by the wave plates 1 and 17. This means that polarisation sensitive components cannot be used outside the drum, with the attendant problems that it is difficult to direct sufficient light into the focus detection components 14–16 and correspondingly difficult to prevent most of the relevant light being directed back into the laser 11, which can cause undesired modulation of the output radiation.

These problems can be overcome if the rotating beam splitter 4 is provided with a coating which has high reflectivity for one polarisation, but medium reflectivity for the orthogonal state. In this case the quarter-wave plates 3 and 5 are arranged to switch the polarisation between these two states. The beam splitting ratio of the beam splitter 4, at the second pass, is now determined by the reflectivity for the medium reflectivity polarisation state. The light reflected back along the rotational axis now arrives at the static beam splitter 13 in the opposite polarisation state to that emitted by the laser allowing the use of a polarising beam splitter. Therefore the laser can be isolated from the back reflected light, and nearly all the back reflected light utilized by the detector component 16.

Another advantage which accures if such a polarisation sensitive coating used in the beam splitter 4 is that the light transmitted to the tape is circularly polarised, as opposed to the elliptical polarisation which otherwise results.

With careful control of the alignment of the various polarisation affecting components, either of these systems can be used with magneto-optic recording media. Slight rotations in polarisation caused by the medium are effectively analysed by the polarising beam splitter 4. The best 'read' signal can be achieved by summation of the signals from the split portions of detector 10 which does, however, require the transmission of an electronic data signal across the rotating interface.

The present invention provides a single channel optical recording system which does not require a second rotating optical element. The system uses conventional compact disc technology for focus error correction outside the rotating drum. Light transmitted to and from the drum is at all times axially symmetric, thus circumventing the problem of image rotation. Lateral error correction takes place entirely within the drum, requiring only the transmission of d.c. electrical power across the rotating interface. The optical components within the drum are symmetric, and therefore mechanically balanced. This recording system is made polarisation sensitive, either by using a standard design of beam splitter within the drum, or by using a custom designed beam splitter to obtain the maximum optical efficiency from the system. Both implimentations could be used with magneto-optic media, in addition to dye-polymer phase contrast media.

When writing optically upon a medium (such as tape) it is necessary to be certain of the exact position in which the data is being written. If this is not done then previously written data may be corrupted by over-writing, or at least inefficient use may be made of the available storage space. In optical disc technology this positioning may be achieved either by mechanical reproduceability, or by preformatting the disc. Neither of these techniques are readily available to optical tape technology.

An essential requirement for an optical writing system is that data be written along a track with a precise displacement from the previously written track. In optical tape technology, this can be achieved if two accurately spaced spots are used for reading and writing, with the writing spot independently modulated; thus there is a necessity for a dual beam read/write system.

In the typical optical recorder, the track separation is about 1.6 um (held to an accuracy of better than 0.1 um). With a focusing objective having a focal length of 6.5 mm, this results in an angular separation of the two beams of 50±3 seconds of arc. In addition, for a single channel system, the two beams must be coincident whilst entering the drum otherwise one spot image rotates about the other on the tape.

Thus, a single channel recording system requires a means of accurately angularly separating two beams which are coincident on entering the rotating drum. Since the system preferably (as described hereinbefore) uses polarisation for input and output path separation, the wavelength characteristic is advantageously used for the distinguishing feature.

An accurately constructed dispersive element such as a prism is required. However, it is important to avoid adding aberrations to what might be a slightly converging or diverging composite beam. It is also desirable to transmit only the read beam to the tracking error detector, which requires a sharp cut-off filter, for example a spatial filter (such as a 1.5 um pinhole over the detector), or an optical colour filter.

Considering these requirements, and the nature of the single axis system, an alternative or addition to the prism is to make the beam-rotating beam-splitter element (4 in FIG. 1) wavelength sensitive, in addition to the polarisation sensitivity for the wavelength of the reading beam. The ideal coating is totally reflective with all polarisation states for the wavelength of the writing beam whilst performing in a different manner for the wavelength of the reading beam.

Figure 3:
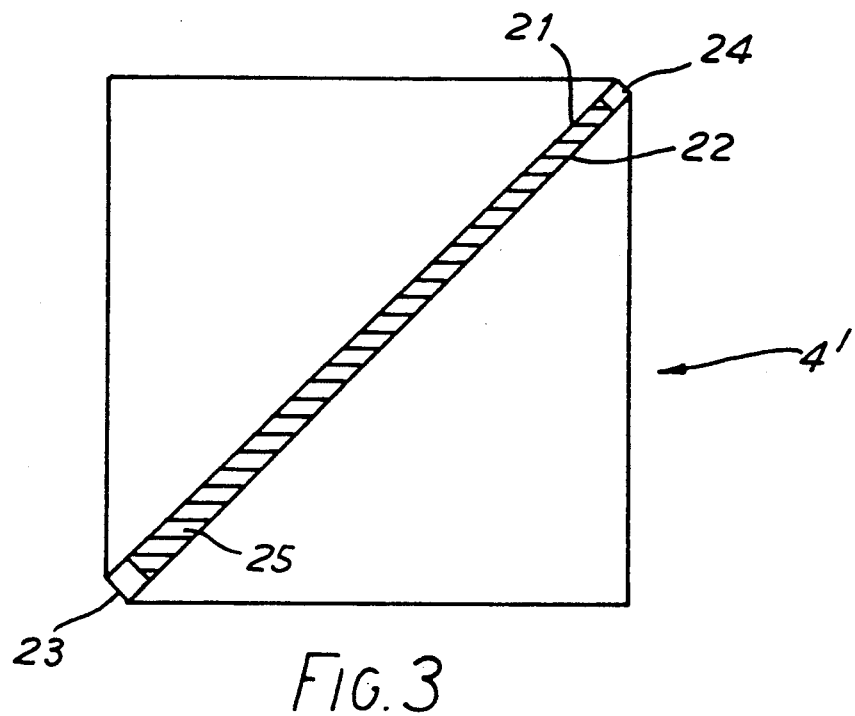
FIG. 3 shows an wavelength-separating cube.

One way to achieve this above-described performance, utilising a cube beam splitter $4^1$ (see FIG. 3) is to use separate coatings on the two inner surfaces 21 and 22 and to accurately separate these surfaces by a wedge-shaped gap using two different spacers 23 and 24. The gap is filled with a material 25 such as an epoxy material, having a refractive index chosen to avoid total internal reflection at the surfaces.

The first surface 21 now becomes a sharp wavelength filter which totally reflects the write beam, and totally transmits the read beam. The second surface 22 is treated as described in relation to FIGS. 1 and 2 to render it polarisation sensitive. By making the gap an exact (better than 1.5 seconds of arc) wedge shape, the required angular separation between the two beams may also be achieved.

An alternative to the use of the read beam for both lateral and focal tracking is also possible. The write beam returning on axis after reflection from the tape may be used to determine the focal tracking error, whilst the read beam is used entirely for lateral tracking error detection which, as before, is condducted wholly within the drum. In this case, the functions of these beams may be redefined with the "read beam" being used power only for tracking, and the "write beam" being used at low to provide a read signal and, during the high write pulses, to provide a write confirmation signal.

Figure 4:
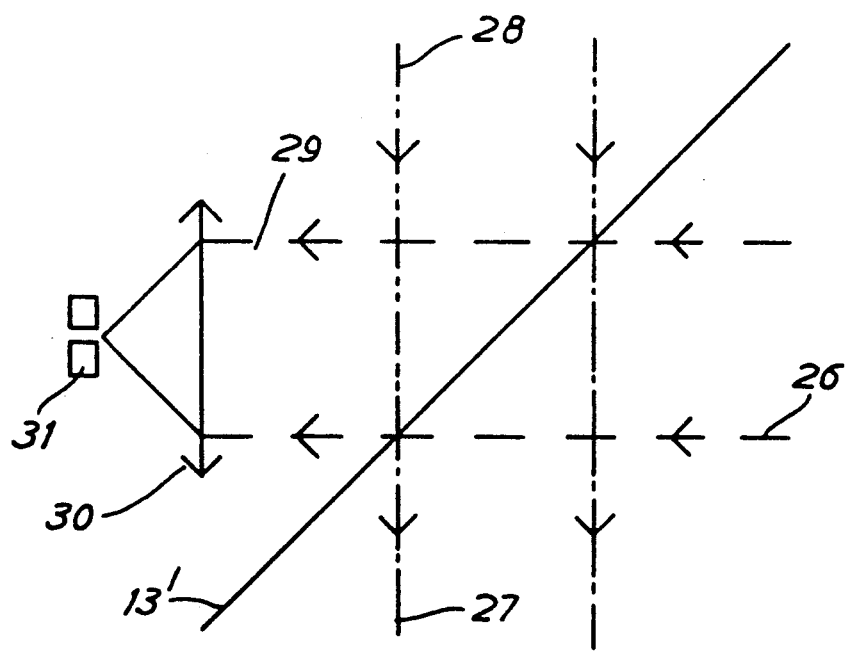
FIG. 4 shows the essential beam paths in a beam combiner.

In the system described above it is assumed that the read and write beams are accurately aligned to within 3 seconds of arc before entering the drum on axis. Clearly the two beams may be made coincident by utilising, as the stationary beam splitter $13^1$, another sharp cut off reflective wavelength filter (see FIG. 4). The beams are then arranged such that the reflected "read" beam 26 entering from the right is deflected as 27 into the path of the transmitted 'write' beam 28.

Up to this point it is assumed that the two beams, once aligned in this way, remain so unless the optical system is disturbed. It may be, however, that with the high tolerance requirements placed on the system, the two beams drift apart due to thermal and vibration effects within the system. A solution to this problem is to actively track one of the beams with the other. The error signal for this tracking can be taken from light reflected and transmitted in the unused direction 29 from the beam combiner $13^1$. The combiner is thus coated to deflect portions of the read and write beams into this alternative path 29 where they are imaged by a lens 30 onto a conventional focus and tracking error detector 31.

The error signal for this dual beam tracking is derived from the split error detector signals by comparing them for low and high power states of the write beam. The actual tracking errors are very much lower in both amplitude and frequency than the conventional tracking errors but the response of the servo mechanism are preferably faster.

As described above, a coated surface is used to achieve the combination and active alignment of two beams. In order to cut down the number of optical elements in the system and surfaces within the beam path it is desirable to use an existing optical element for the beam combination. A suitable surface is in the prism anamorphiser (see FIG. 5) which corrects the shape of the collimated laser output. This system avoids adding any additional surfaces to the existing beam path. Furthermore, different compression ratios may be achieved for each beam.

Figure 5:
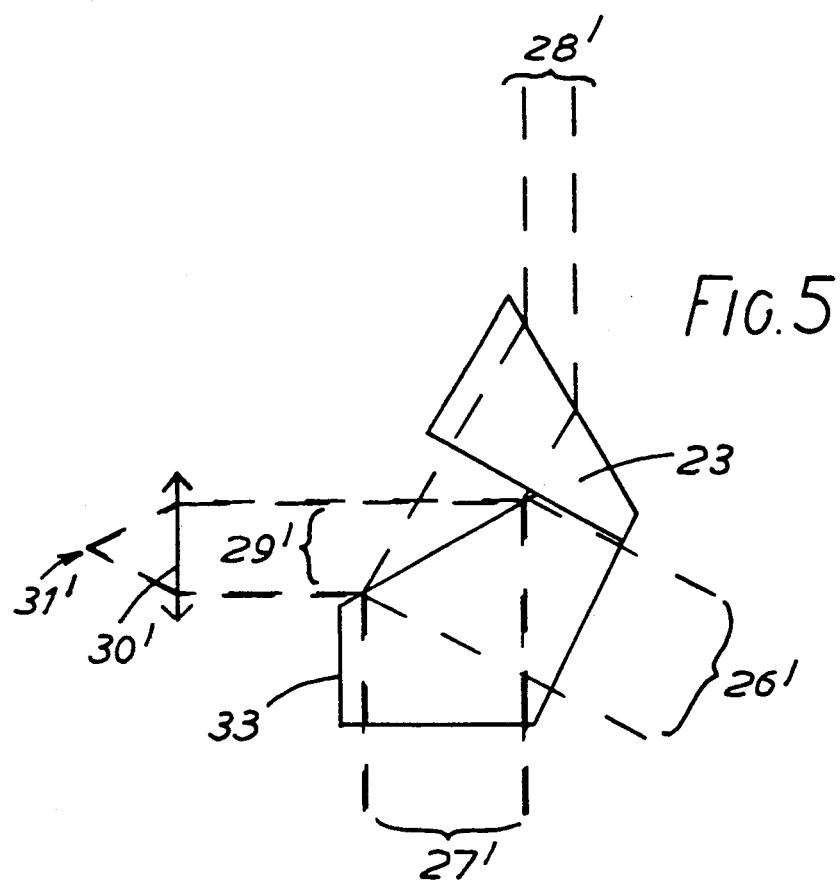
FIG. 5 shows an anamorphic beam combiner.
Figure 6:
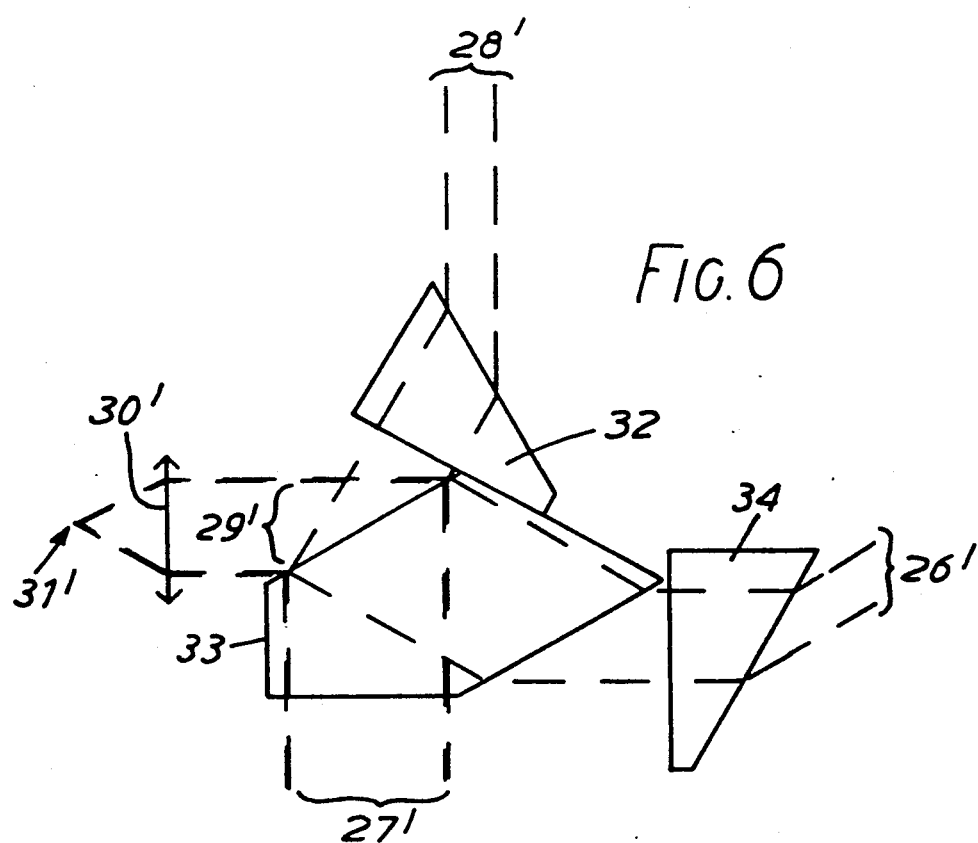
FIG. 6 shows an anamorphic beam combiner for use with a pair of laser diode sources.

If the read beam is from a non laser diode source and already circular in profile only the two write beam compresser prisms 32, 33 need be used as shown in FIG. 5. If on the other hand the read beam is from a laser diode source, one additional prism, 34, is needed (see FIG. 6). The read and write beams are indicated in FIGS. 5 and 6 by the same numerals as were used in FIG. 4, but with primes added.

The techniques described above are generally applicable to other optical data storage systems, for example in the production of a multibeam system using a number of different wavelengths and cascaded beam combiners. In this case the beams are separated by a dispersive element within the drum. The practical limit on the number of beams arises from aberrations and losses induced within the system.

The track following technique is applicable to optical discs, using the above system as described, or the beam separating prism could be removed and the beams angled from the anamorphic prism since there are no rotating optical elements within the system.

The present invention relates to a dual beam tracking system to write compact data in a single channel optical tape recorder, achieving this tracking within the drum without any additional optical elements. Moreover, the passive or active alignment of the two beams before entering the drum is achieved using an extension of the anamorphic prism pair without introducing additional optical surfaces into the beam paths.

Figure 7:
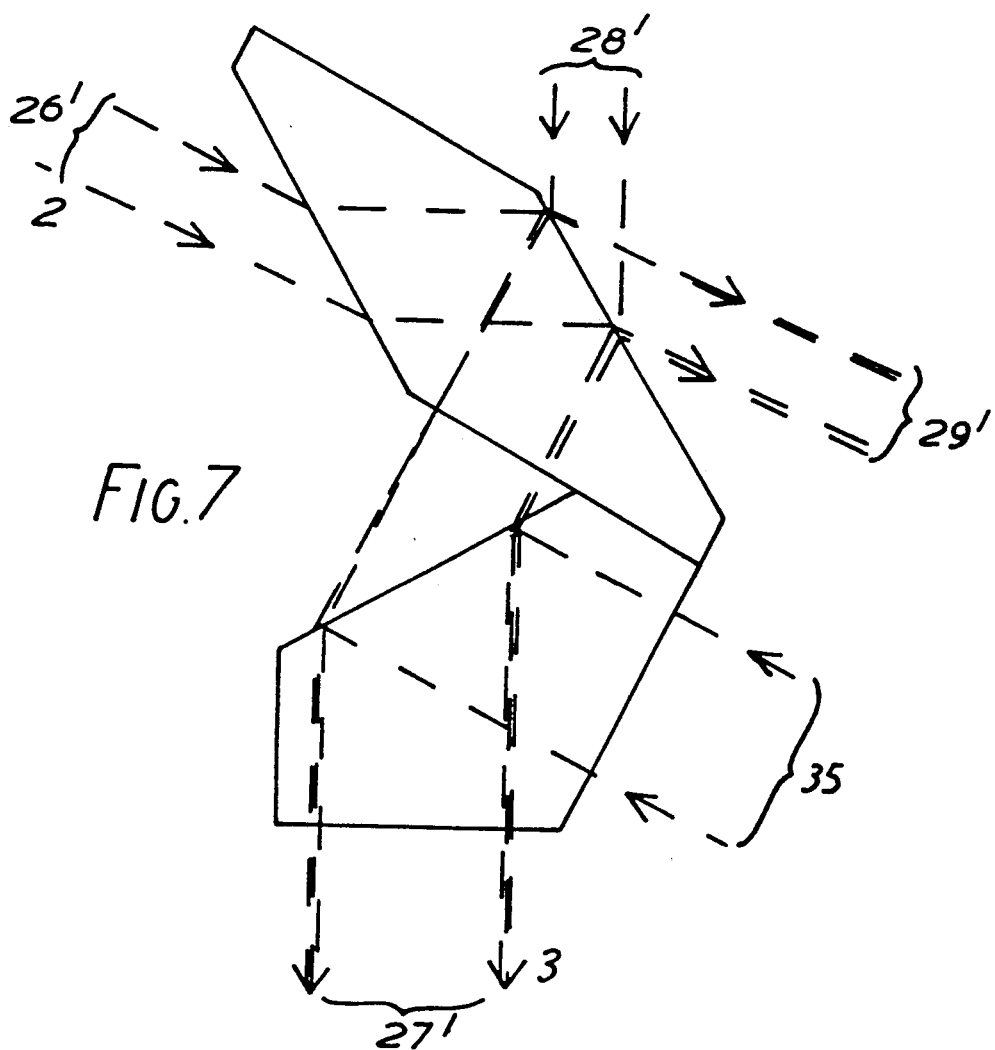
FIG. 7 shows a two-element anamorphic combiner capable of dealing with beams from three sources.

The structure shown in FIG. 7 achieves the objectives of the arrangements of FIGS. 5 and 6 but the different arrangement of beam paths enables an extra beam path 35, for example an erase beam, to be accommodated.

Since no high density data storage mechanism can write 100% reliably it is desirable to verify newly written data. With techniques previously disclosed herein, this verification is achieved by reading data from the track written on the previous scan. This results in a delay of one scan length between writing and verification. The verification of newly written data is usually carried out with the intention of re-writing any erroneously recorded data. In order to do this a copy of the newly written data must be stored until it is verified. This requires substantial storage capabilities, and it is preferable to provide a verification process capable of responding within say 10-20 data bits after the data has been written.

Figure 8:
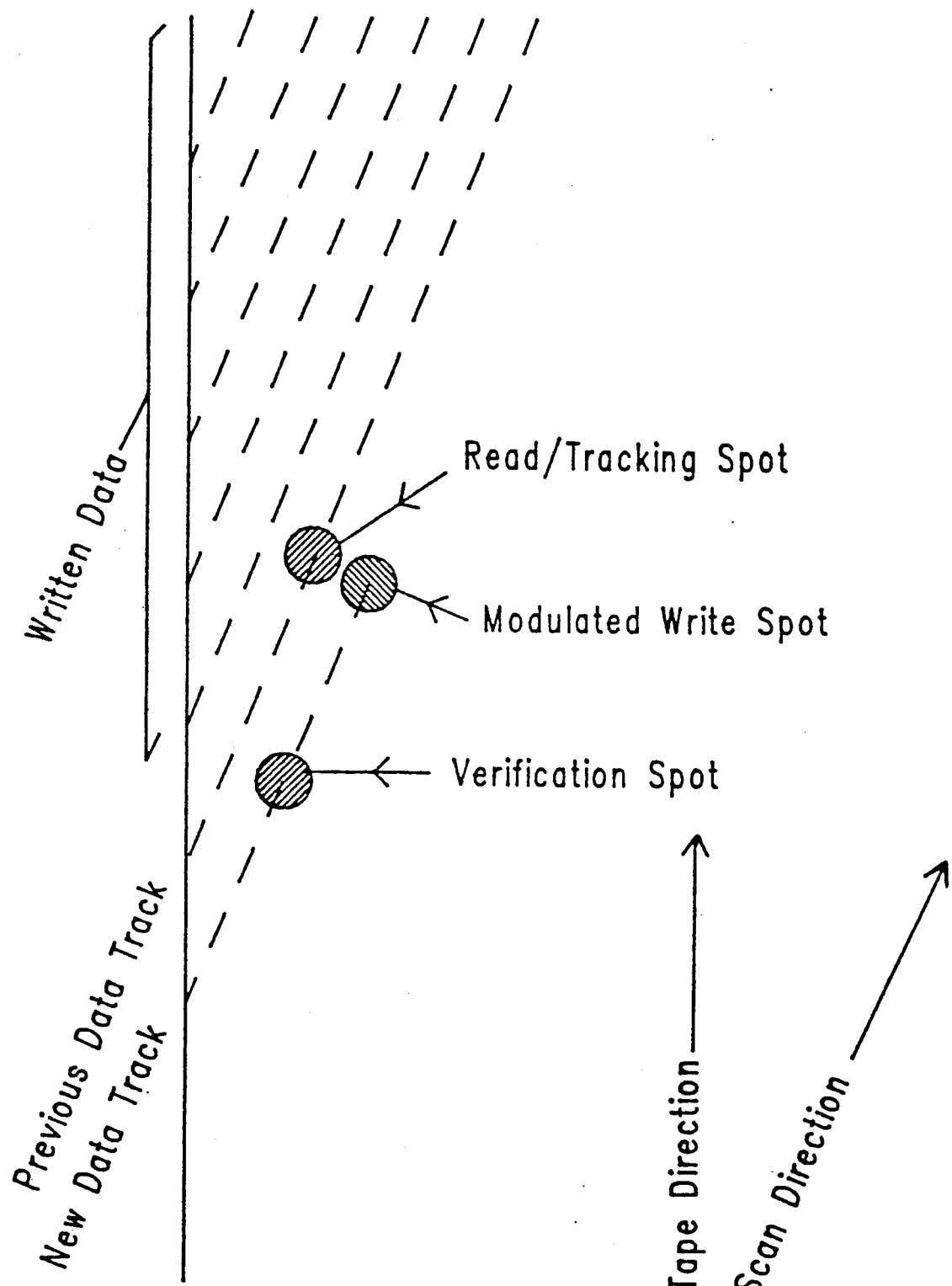
FIG. 8 shows a spot pattern required to permit tracking, read, write and verifying operations to be effected substantially simultaneously.

To do this it is necessary to generate three spots, as shown in FIG. 8, one independently modulated for writing, and the others for verification of the present track, and tracking and reading the previous track respectively. For the axial optical system described hereinbefore, these beams must be generated from coaxial beams only. Furthermore, the generated spots cannot be colinear, since two are on the same linear track, and the third is on a different track.

This lack of colinearity prevents the use of three different wavelength beams with a dispersive element. However, this spot pattern can be achieved with a combination of a grating and the techniques described hereinbefore. Furthermore this may be achieved by a single moulded element, or, for a mechanically balanced solution, with a two component device.

Figure 9:
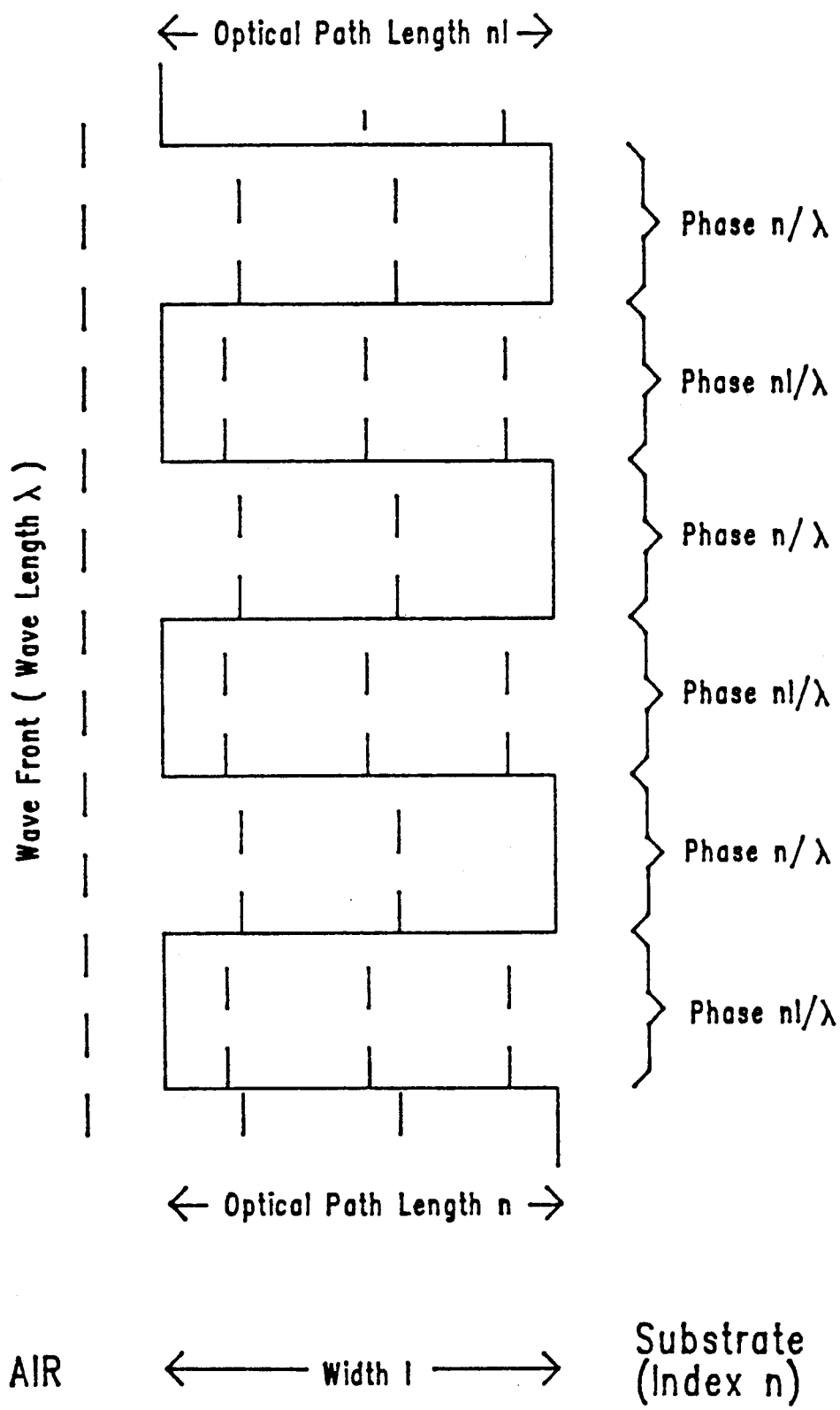
FIG. 9 shows the use of a relief structure as a phase grating.

Using the techniques described hereinbefore it is possible to shift the position of a write spot relative, not only to a single read spot, but to any pattern of spots. Thus the requisite pattern of spots (FIG. 8) can be produced provided the read spot can be independently separated into two read spots. Such a separation of one beam into two can be achieved with a diffraction grating which typically will generate multiple write spots in addition to the two read spots. However, it the grating is a phase grating (FIG. 9) whose retardation of the write wavelength is an integer number of wavelengths for every part of the grating, then the net effect on the incident write wavefront is negligible. Some effect will result from the boundaries between regions of different integer retardations.

Since the read beam is of a different wavelength, the retardation of the various sections of the phase grating will usually be non-integer multiples of the read wavelength. For instance a path difference of 6.64 μm corresponds to 8 wavelengths at 830 nm and 7.51 wavelengths at 780 nm. There is also a small but significant effect due to the refractive dispersion of the grating material. Thus the latter retardation becomes 8.54 wavelengths. The generation of this half wavelength phase difference is important, as a phase grating which has alternate in phase and antiphase components will generate two principal spots centered on the original beam axis. If the regions are of equal net area there will be no undeflected zero order beam. The separation and direction of displacement of the two read spots are determined by the pitch of the grating and its orientation within the beam respectively.

Using this phase grating the coaxial read and write spots are converted into three colinear spots. The techniques described hereinbefore can now be used to displace the write spot to a position adjacent to one of the read spots, thus achieving the requisite spot pattern.

Figure 10:
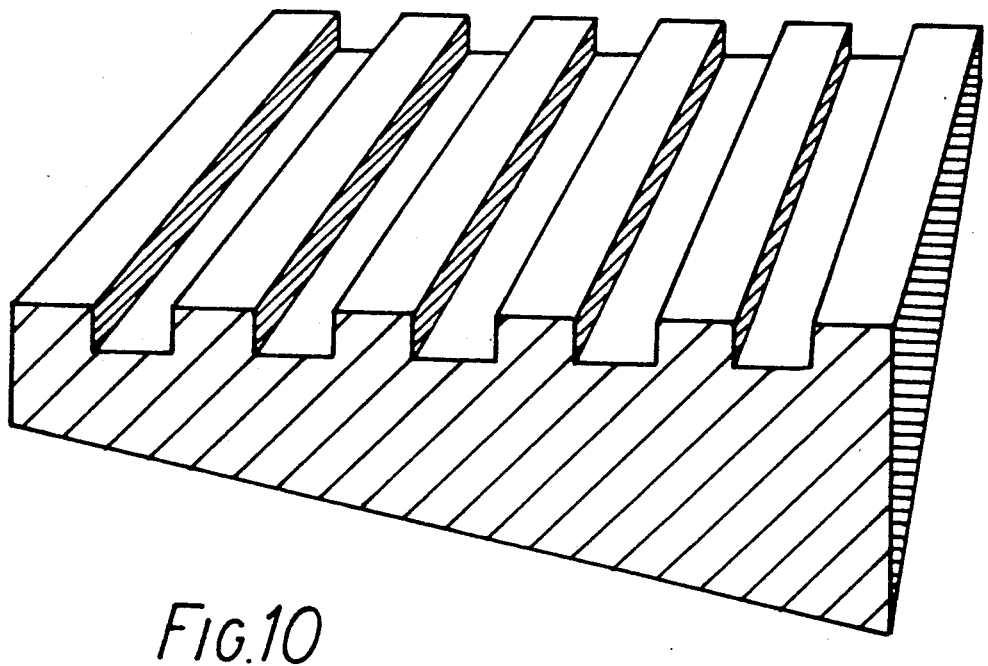
FIG. 10 shows a grating and prism combined in a single element.

One of the methods of separating the read and write beams is the use of a refractive dispersive element, wuch as prism. If a prism with integral grating (FIG. 10) is used then it may be manufactured as a single moulding. Such an element is best placed axially within the drum, before the beam deflecting element. This allows the grating surface to be aligned orthogonal to the incoming axial beams at all times.

Since this prism element performs all the beam separation tasks, the beam deflecting element need not separate the two wavelengths as described hereinbefore. The elimination of the back reflected write beam may be achieved by making the retro-reflective mirror wavelength sensitive.

In order to maintain a balanced system a pair of prisms with differing dispersions, but similar refractive indices, may be used.

Placing this grating element in the beams affects the returned focus control beam. If the medium forms a perfectly flat and uniform reflector in the focal plane then a reflected phase image of the grating will be formed at the grating. Since two half wave retardations are equivalent to no retardation, the net effect on the beam is zero. If the medium is out of focus then a magnified image of the grating will be produced, and the mismatch with the original will result in a mixture of in-phase and antiphase strips. The difference in reflection between the two read spots will degrade this behaviour further.

On the other hand, with feedback the medium remains reasonably near focus, and the two spots are only partially modulated. Furthermore all these effects occur in the direction of separation between the two spots. In the orthogonal direction the beam is unaffected. Therefore, the net effect on the focus control signal is small, particularly for frequencies below that of the data.

What is claimed is:

1. An optical recording arrangement for generating a beam of optical radiation about an optic axis and an optical system for constraining said beam to impinge upon a recording tape which is capable of moving, relative to the beam, in such a way that the beam scans a surface of the tape in accordance with a prescribed pattern of information tracks assigned to said surface and comprising a plurality of parallel tracks inclined to a direction of the motion, wherein the optical system includes first components which remain stationary relative to the source means and second components which are subject to rotational movement, said second components mounted within a drum member having a peripheral second components which are subject to rotational movement, said surface around which surface said tape is constrained to pass for exposure to said beam, said rotational movement being relative to said source means and said first components, about an axis of rotation which coincides with the optic axis of said first components, the aforesaid motion of the tape relative to the beam including at least a rotational movement about said axis of rotation at the same rate as that at which said second components rotate thereabout; the second components including sensing means for sensing tracking errors, which sensing means comprises a split semiconductive device positioned to receive optical radiation reflected from said tape: the second components further including a beam splitting device arrnged and disposed to direct radiation from said source means radially of said drum and toward said tape, and influenced by data recorded therein, along said axis of rotation toward said split semiconductor device.

2. An arrangement according to claim 1 wherein said beam splitting device is configured and constructed to transmit radiation reflected from said tape to a reflective component disposed radially of said drum and to reflect radiation, reflected back thereto by said reflective component, along said axis of rotation and toward said split semiconductive device.

3. An arrangement according to claim 2 wherein said second components include single quarter wave plate devices disposed in a path of said radiation,
 (a) to said beam splitting device,
 (b) between said beam splitting device and said tape.

4. An arrangement according to claim 3 wherein said second components further include a single dichroic sheet polariser disposed in the path of said radiation between said beam splitting device and said split semiconductive device.

5. An arrangement according to claim 1 wherein said first components include a further beamsplitting means for providing a plurality of beams from said beam of optical radiation, and further includes combining means for combining a plurality of beams and for causing said beams and for causing said beams to be conveyed to said second components in alignment with said axis of rotation.

6. An arrangement according to claim 5 wherein said combining means comprises a prism anamorphisor arrangement.

7. An arrangement according to claim 5 wherein said combining means is further arranged to direct radiation returned from said second component toward said source means toward error analysing detectors.

8. An arrangement according to claim 1 wherein said combining means comprises a prism amorphisor arrangement.

9. An arrangement according to claim 1 wherein said combining means and said beam splitting device are arranged in combination to permit simultaneous scanning of three spots on said tape, said spots being used respectively for writing, reading and tracking, and data verification.

* * * * *